US012779688B2

(12) United States Patent
Oumi

(10) Patent No.: US 12,779,688 B2
(45) Date of Patent: Nov. 3, 2026

(54) ROBOT SIMULATION DEVICE

(71) Applicant: Fanuc Corporation, Yamanashi (JP)

(72) Inventor: Tatsuya Oumi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 140 days.

(21) Appl. No.: 18/687,141

(22) PCT Filed: Sep. 15, 2021

(86) PCT No.: PCT/JP2021/033968
§ 371 (c)(1),
(2) Date: Feb. 27, 2024

(87) PCT Pub. No.: WO2023/042309
PCT Pub. Date: Mar. 23, 2023

(65) Prior Publication Data
US 2024/0424674 A1 Dec. 26, 2024

(51) Int. Cl.
*B25J 9/00* (2006.01)
*B25J 9/16* (2006.01)

(52) U.S. Cl.
CPC ........... *B25J 9/1671* (2013.01); *B25J 9/1653* (2013.01)

(58) Field of Classification Search
CPC .............................. B25J 9/1671; B25J 9/1653
See application file for complete search history.

(56) References Cited

U.S. PATENT DOCUMENTS

| | | | | |
|---|---|---|---|---|
| 8,731,886 | B2 | 5/2014 | Ryou | |
| 8,825,463 | B2 | 9/2014 | Nomura et al. | |
| 2003/0090483 | A1 | 5/2003 | Watanabe et al. | |
| 2019/0160678 | A1* | 5/2019 | Zhang | B25J 9/163 |
| 2019/0224848 | A1* | 7/2019 | Neubauer | B25J 9/163 |

FOREIGN PATENT DOCUMENTS

| | | | |
|---|---|---|---|
| JP | 04255003 | A | 9/1992 |
| JP | 05200638 | A | 8/1993 |
| JP | 2003150219 | A | 5/2003 |
| JP | 2005135095 | A | 5/2005 |
| JP | 2013144349 | A | 7/2013 |
| JP | 2015085440 | A | 5/2015 |
| WO | 2008117361 | A1 | 10/2008 |

OTHER PUBLICATIONS

International Search Report and Written Opinion for International Application No. PCT/JP2021/033968, dated Nov. 30, 2021, 5 pages.

* cited by examiner

*Primary Examiner* — Aaron G Cain
(74) *Attorney, Agent, or Firm* — BUCHANAN INGERSOLL & ROONEY PC

(57) ABSTRACT

This robot simulation device includes: a first load setting unit which sets, as a load, at least one among a hand provided to a robot and a workpiece to be gripped by the hand; a second load setting unit which sets a load acting on the robot and displayed in animation; a load recording unit which records a set load, which is set by the first load setting unit, and a load, which is set by the second load setting unit and displayed in animation; and a comparing unit which compares the recorded set load and the load displayed in animation. Accordingly, on-site correction work on an operation program for the robot is reduced.

2 Claims, 5 Drawing Sheets

ROBOT SIMULATION DEVICE

CROSS REFERENCE TO RELATED APPLICATIONS

This is the U.S. National Phase application of PCT/JP2021/033968, filed Sep. 15, 2021, the disclosure of this application being incorporated herein by reference in its entirety for all purposes.

FIELD OF THE INVENTION

The present invention relates to a robot simulation device.

BACKGROUND OF THE INVENTION

When a robot actually operates based on the operation program thereof, it is necessary to set the load which will be exerted on the robot correctly.

In order to understand in advance the reliability of the operations performed by a robot and the safety of the surrounding environment, the robot is simulated using an offline programming system, and the cycle time is calculated in accordance with a set load (refer to, for example, Patent Literature 1 (Unexamined Patent Publication (Kokai) No. 2013-144349)).

Patent Literature

PTL 1: Unexamined Patent Publication (Kokai) No. 2013-144349

SUMMARY OF THE INVENTION

However, the cycle time can be calculated, since simulation can be executed, even if the load is not set accurately or setting of the load itself is not performed. In such a case, when the robot is actually operated and the cycle time is measured, the actual cycle time may differ from the cycle time calculated by simulation. Thus, it is necessary to modify the robot operation program on-site, which results in a problem in that the startup of the robot is delayed.

Thus, there is a need for a robot simulation device which can reduce the amount of on-site operation program modification operations.

According to a first aspect of the present disclosure, there is provided a robot simulation device which is executed by an offline programming system and which includes at least one robot in an offline workspace, the device comprising a first load setting part for setting at least one of an end effector provided in the at least one robot and a related part of the end effector as a load, a second load setting part for setting a load to be exerted on the at least one robot in the simulation device and which is to be displayed by animation, a load storage part which stores a set load set by the first load setting part and a load in the animation set by the second load setting part during simulation execution in the robot simulation device, and a comparison part which compares the set load and the load in the animation stored by the load storage part.

In the first aspect, since the load of the robot in the animation and the set load are compared, if the difference between the two exceeds the predetermined threshold, it can be seen that the load is not accurately set. Thus, by resetting the set load, the cycle time in the simulation becomes accurate, and as a result, it is possible to reduce the on-site modification work of the operation program.

The first aspect is particularly advantageous if, when creating an operation program for a robot, the operator only inputs load in the animation and forgets to input a set load.

The objects, features, and advantages of the present invention will become more apparent from the following description of the embodiments in conjunction with the attached drawings.

DETAILED DESCRIPTION OF EMBODIMENTS OF THE INVENTION

Figure 1:
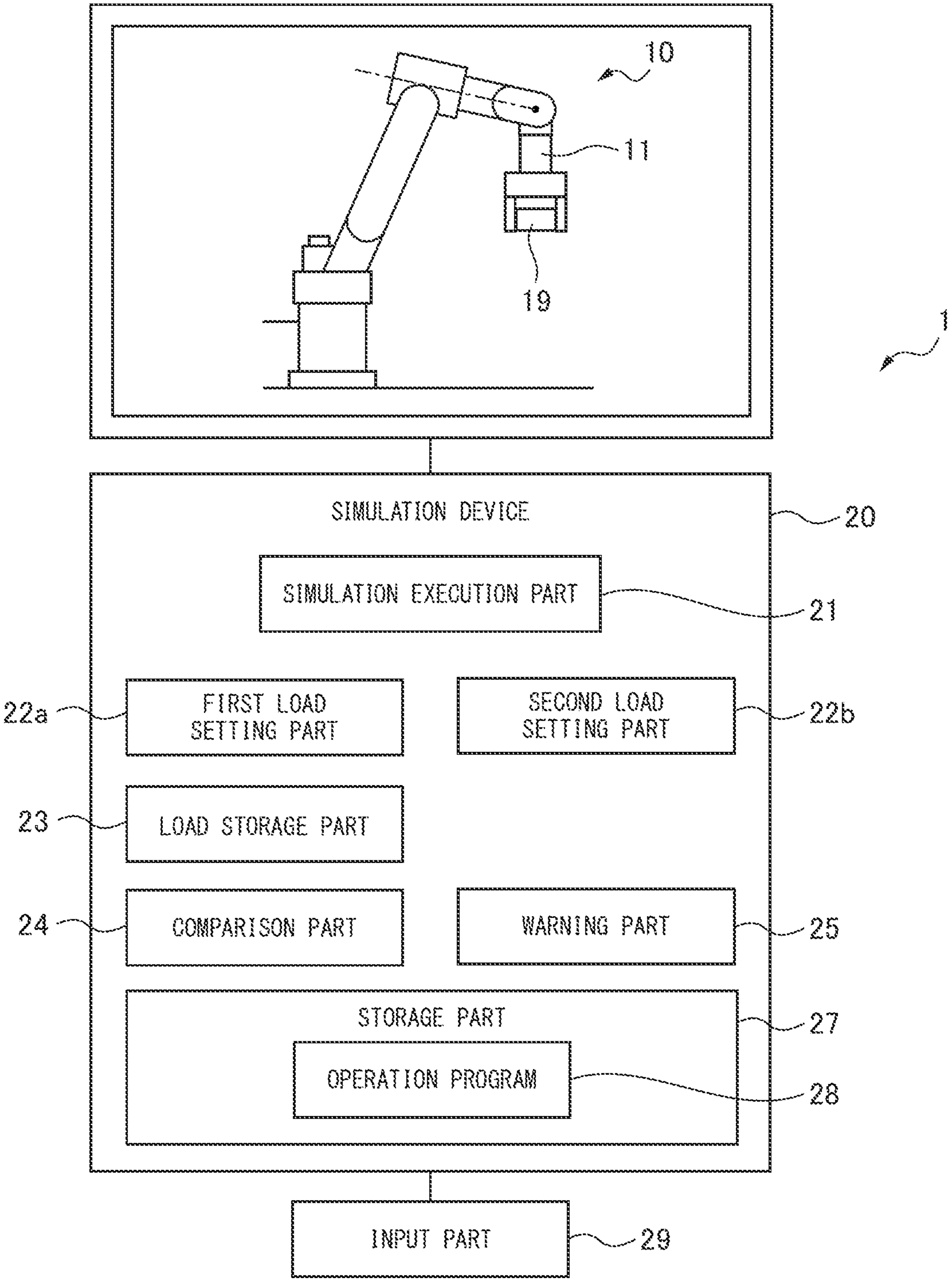
FIG. 1 is a block diagram of a robot simulation device according to the present disclosure.

The embodiments of the present disclosure will be described below with reference to the attached drawings. In the drawings, corresponding constituent elements have been assigned common reference signs.

FIG. 1 is a block diagram of a robot simulation device according to the present disclosure. The robot simulation device 1, which is executed by an offline programming system, includes a controller 20 for controlling simulation processing, and the simulation status is displayed on a display part 5 connected to the controller 20.

A model of a vertically articulated robot 10 having a plurality of axes in the offline workspace is displayed on the display part 5, for example, a CRT or liquid crystal display. The model of the robot 10 shown in FIG. 1 comprises a model of a hand 11 as an end effector at its end. The model of the hand 11 is holding the model of a workpiece 19.

Hereinafter, in the present specification, the model of the robot 10, the model of the end effector (for example, the hand 11), and the model of the workpiece 19 may be simply referred to as the robot 10, the end effector (hand 11), and the workpiece 19, respectively. It should be noted that models of a plurality of robots 10 with similar configurations may be displayed and simulated. Moreover, the robot 10 may have other forms.

Furthermore, the end effector, for example, the hand 11, includes various types of hands capable of gripping the workpiece 19, such as an open/close type hand, a vacuum suction type hand, and a magnetic suction type hand. In the following embodiment, the operation of gripping/releasing the workpiece 19 by the open/close type hand 11 as an end effector will be described. However, the present invention is not limited to such operations, and various operations in which the related part is affected by the end effector, and specifically, other operations in which the weight (load) of the related part changes as the robot 10 moves may be included.

For example, an operation in which a painting head as an end effector sprays a paint filled in a paint can provided on the robot 10 as a related part while the robot 10 moves, and an operation in which a chip suction tool as an end effector suctions chips and stores it in a chip storage tank as a related part while the robot 10 moves are also included in the scope of the present disclosure.

The controller 20 is a computer including a CPU (central processing unit), memory, etc., and includes a simulation execution part 21 which simulates operation of the robot 10, for example, an operation of grasping a workpiece 19 and releasing it after moving, using a known method. The controller 20 comprises a first load setting part 22*a* which sets at least one of an end effector provided on the at least one robot 10, for example, the hand 11, and a related part of the end effector, for example, a workpiece 19, as a load. The first load setting part 22*a* may set at least one of the hand 11 provided on the robot 10 and the workpiece 19 to be gripped by the hand 11 as the load. The controller 20 further comprises a second load setting part 22*b* which sets the load, which acts on the robot 10 in the simulation device 1 and which is displayed by animation. It should be noted that these load setting parts 22*a* and 22*b* are program parts which read "one or more lines" where a corresponding load is set from the operation program 28, and interpret that the load is set.

The controller 20 comprises a load storage part 23 which stores the set load set by the first load setting part 22*a* and the load in the animation set by the second load setting part 22*b* during simulation execution by the simulation execution part 21, and a comparison part 24 which compares the set load and the load in the animation stored by the load storage part 23. Further, the controller 20 includes a warning part 25 which outputs a warning to the operator in the form of a sound and/or a message.

The simulation execution part 21, load setting parts 22*a*, 22*b*, load storage part 23, comparison part 24, and warning part 25 are functional modules realized by a computer program executed by the CPU of the controller 20. The operation program 28 is stored in a storage part, for example, a memory, of the controller 20. The storage part 27 also stores various data used or created in various processes executed by the CPU.

It should be noted that the computer program for executing the processing of each unit included in the CPU may be provided in the form of being stored in a computer-readable storage medium such as a semiconductor memory, a magnetic storage medium, or an optical storage medium.

Figure 2:
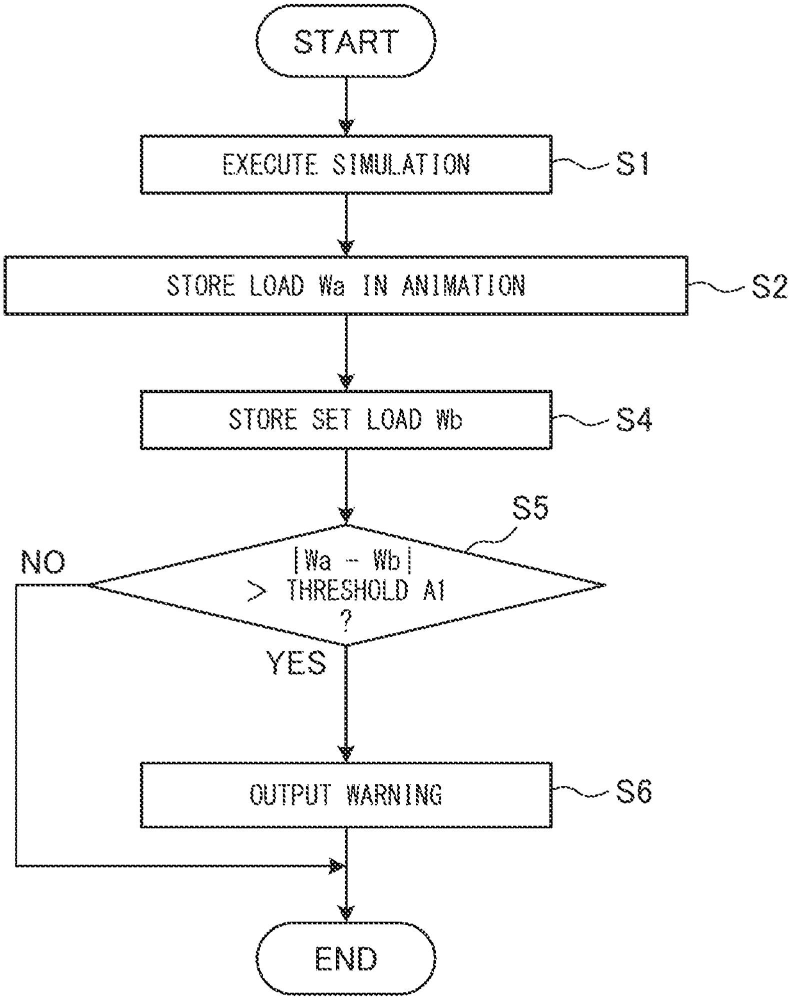
FIG. 2 is a flowchart showing the operations of the robot simulation device based on a first embodiment.

FIG. 2 is a flowchart showing the operation of the robot simulation device according to the first embodiment. First, in step S1, the simulation execution part 21 executes a simulation of the robot 10 based on the operation program 28 of the robot 10 stored in the storage part 27, for example, the memory.

The operation of the robot 10 in the present disclosure includes at least grasping and releasing of the workpiece 19 by the hand 11. The operator creates the operation program 28 in advance using an input part 29 of the controller 20, such as a keyboard and mouse. Alternatively, the operation program 28 may be created in advance by an operator or another vendor using a computer other than the controller 20.

When the simulation is executed, the robot 10 is animated on the display part 5 as an animation. Thus, the gripping motion of the workpiece 19 and the releasing motion of the workpiece 19 by the hand 11 of the robot 10 are also animated in the animation. When the simulation ends, the cycle time when performing the operations described in the operation program 28 is acquired.

A part of the operation program 28 of the robot 10 of a typical embodiment is as follows.

```
1: !FANUC;
2: !ROBOGUIDE Generated This TPP;
3: !Run SimPRO.cf to setup frame and;
4: tool coordinate number [GP1]=1;
5: user coordinate number [GP1]=0;
6: load setting [1: EOAT w/o part];
7: each axis position [1] 100% positioning;
8: ! MoveTo-Pickup ('work05') From (;
9: each axis position [2] 100% positioning;
10: each axis position [3] 100% positioning;
11: ! Pickup ('work05') From ('Pallet;
12: ! WAIT 0.00 (sec);
13: load setting [2:EOAT with part];
14: linear position [4] 2000 mm/sec positioning;
15: ! MoveTo-Drop ('work05') From ('G;
16: each axis position [5] 100% positioning;
17: each axis position [6] 100% positioning;
18: ! Drop ('work05') From ('GP: 1-;
19: !WAIT 0.00 (sec);
20: load setting [1:EOAT w/o part];
21: linear position [7] 2000 mm/sec positioning;
22: each axis position [8] 100% positioning;
```

The starting position of the robot 10 is determined by determining the position of each axis of the robot 10 in "each axis position [1] 100% positioning" on line 7 of the operation program 28. It should be noted that the position of each axis is expressed by three mutually perpendicular axes and angles about these three axes. Furthermore, "MoveTo-Pickup" on line 8 means that the robot 10 moves from the starting position to a certain position, and grips and lifts the workpiece 19 with the hand 11, and the position thereof is determined by "each axis position [2] 100% positioning" on lines 9 and 10.

"MoveTo-Drop" on line 15 means that the robot 10 moves to the desired position to lower the workpiece 19, and the desired position is determined by moving linearly from the grasping position as described on line 14 "linear position [4] 2000 mm/sec positioning", and then determining the position of each axis as described in "each axis position [5] 100% positioning" on lines 16 and 17.

Thereafter, "Drop" on line 18 means that the workpiece 19 is released and lowered by the hand 11. After waiting for the desired time in accordance with "WAIT" on line 19, the robot 10 moves to the end position in accordance with "linear position [7] 2000 mm/sec positioning" on line 21 and "each axis position [8] 100% positioning" on line 22. Specifically, the operation program 28 described above includes the four stages of "start", "gripping", "releasing", and "end."

"Load setting" is written on lines 6, 13, and 20 of the operation program 28 described above. These lines are lines in which the set load Wb of at least one of the hand 11 provided in the robot 10 and the workpiece 19 to be held by the hand 11 should be described. Furthermore, the lines after the fourth line and other than the 6th line, the 13th line, and the 20th line are sets related to animation processing. In other words, these lines are the lines in which the load Wa which acts on the robot 10 in the simulation device 1 and which is displayed by animation is to be written.

It should be noted that the first load setting part 22*a* is a program part which reads lines where the set load Wb should be written, for example, lines 6, 13, and 20, and interprets that that the load Wb is set. Similarly, the second load setting part 22*b* is a program part which reads lines where the set load Wa in the animation is written, for example, the lines after line 4, and lines other than lines 6, 13, and 20, and interprets that the set load Wa is set. These interpretations are performed during simulation execution.

Figure 3:
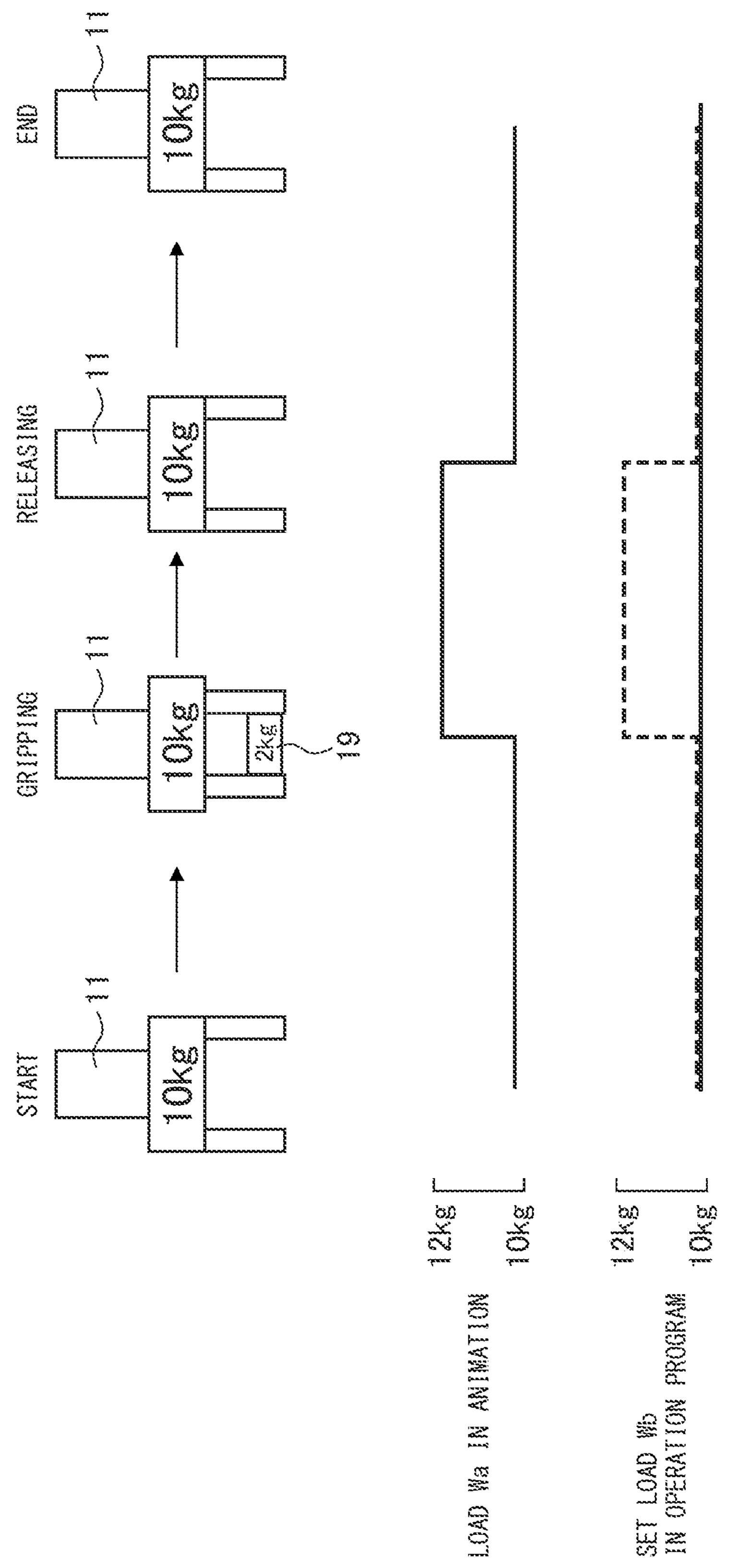
FIG. 3 is a diagram showing a load time chart of the first embodiment.

FIG. 3 is a diagram showing a load time chart of a first embodiment. In FIG. 3, the hand 11 during "start", "gripping" of the workpiece, "releasing" of the workpiece, and "end" in the operation of the robot 10 is shown. These correspond to the hand 11 which is animated during execution of the simulation displayed on the display part 5. Below that, time charts of load Wa in the animation and set load Wb are shown.

In step S2 of FIG. 2, the load storage part 23 stores the load Wa in the animation through the second load setting part 22*b*. Specifically, the load storage part 23 stores the load Wa as a time chart through the actual simulation performed by the simulation execution part 21 regarding the lines for which load Wa is interpreted as being set in the first load setting part 22*a*. In the time chart of load Wa shown in FIG. 3, it can be seen that load Wa at "start", "releasing", and "end" is 10 kg, and load Wa at "gripping" is 12 kg.

In other words, the load (weight) of hand 11 is 10 kg, and the load (weight) of the workpiece 19 is 2 kg. In FIG. 3, "10 kg" is displayed inside the hand 11, and "2 kg" is displayed inside the workpiece 19. Though these numerical values are shown in FIG. 3 for convenience, this does not mean that they will be displayed in the display section 5 in this manner during simulation.

Line 6 in the operation program 28 described above indicates the set load Wb at the time of "start" of the robot 10. Since "Pickup" is written on line 11, line 13 indicates the set load Wb when "gripping" the workpiece 19. Furthermore, since "Drop" is written on line 18, line 20 indicates the set load Wb when "releasing" the workpiece 19.

Specifically, "1:EOAT w/o part" is written on lines 6 and 20, which means "without part", and thus, the load Wb of only the hand 11 excluding the workpiece 19 can be set on lines 6 and 20. Furthermore, since "2:EOAT with part" is written on line 13, the total load Wb of workpiece 19 and hand 11 can be set on line 13.

Next, in step S4, the load storage part 23 stores the set load Wb through the first load setting part 22*a* based on the operation program 28. Specifically, the load storage part 23 stores the load Wb in the form of a time chart based on the lines on which it is interpreted that the load Wb is set by the second load setting part 22*b*, for example, lines 6, 13, and 20. It should be noted that when storing the load Wb, it is not necessary to execute the simulation by the simulation execution part 21, and step S4 may be performed before executing the simulation. In the set load Wb time chart shown in FIG. 3, as indicated by the solid line, Wb during all of "start", "gripping", and "releasing" is 10 kg.

Next, the process advances to step S5, and the comparison part 24 compares the load Wa in the animation and the set load Wb. Specifically, the comparison part 24 determines whether the absolute value |Wa−Wb| of the difference between the load Wa in the animation and the set load Wb is greater than a predetermined threshold A1. The threshold A1 is approximately equal to the weight of the workpiece 19.

In the example shown in FIG. 3, the load Wa in the animation increases from 10 kg to 12 kg at the time of "grasping", whereas the set load Wb indicated by the solid line does not change from "start" to "end" and remains at 10 kg even during "grasping."

In such a case, it can be determined that during "grasping" (line 13 of the operation program 28), only the load of the hand 11 is input, and the load of the workpiece 19 is not input. Thus, it is determined that the absolute value |Wa−Wb| of the difference at the time of "grasping" is greater than the threshold A1, and the process advances to step S6.

In step S6, the warning part 25 outputs a warning to the operator in the form of a sound or a message to modify the operation program 28.

Conversely, regarding the set load Wb indicated by the broken line in FIG. 3, the set load at "start" is 10 kg, but the set load from "grasping" to "releasing" is 12 kg, which returns to 10 kg after "releasing." Thus, in the case of the set load Wb indicated by the broken line, it can be determined that the load is inputted in the operation program 28 in consideration of the load of the workpiece 19.

In such a case, since it has been determined that the absolute value of the difference at the time of "grasping" is not greater than the threshold A1, the process ends without the warning part 25 outputting a warning. In other words, if the set load from "gripping" to "releasing" is greater than the set load at the time of "starting" and "ending" by the threshold A1, it can be determined that the load of the workpiece 19 is input to the operation program 28.

In this manner, in the first embodiment, since the load Wa in the animation of the robot 10 and the set load Wb are compared, when the difference between the two exceeds the predetermined threshold A1, it can be understood that the set load Wb has not been accurately set. Specifically, in the first embodiment, it can be understood that though only the load of the hand 11 is set as the set load Wb, the load of the workpiece 19 is not set. Thus, it is preferable that the warning by the warning part 25 in step S6 indicate that the load of the workpiece 19 is not set.

If it is determined that setting of the set load Wb has not been performed correctly, the operator may reset the set load Wb. In this case, the operator may set a load corresponding to the sum of the load of the hand 11 and the load of the workpiece 19 as the set load Wb at the time of "grasping" on line 13. As a result, an accurate operation program 28 is created, whereby accurate simulation can be performed.

In this manner, in the present disclosure, during execution of a simulation of an offline programming system, it is possible to refer to the load Wa in the animation to determine whether or not the set load Wb has been accurately set. By setting the set load Wb accurately, the cycle time obtained by simulation becomes more accurate. Thus, it is possible to reduce the number of modifications to the actual operation program 28 of the robot 10 in the field.

In this regard, the operators do not conventionally forget to set the load Wa of the robot 10 in the animation when creating the operation program 28. However, there are cases in which an operator forgets to input the set load Wb even after inputting the load Wa. The present disclosure is particularly advantageous when the operator inputs only the load Wa in the animation and forgets to input the set load Wb.

Figure 4:
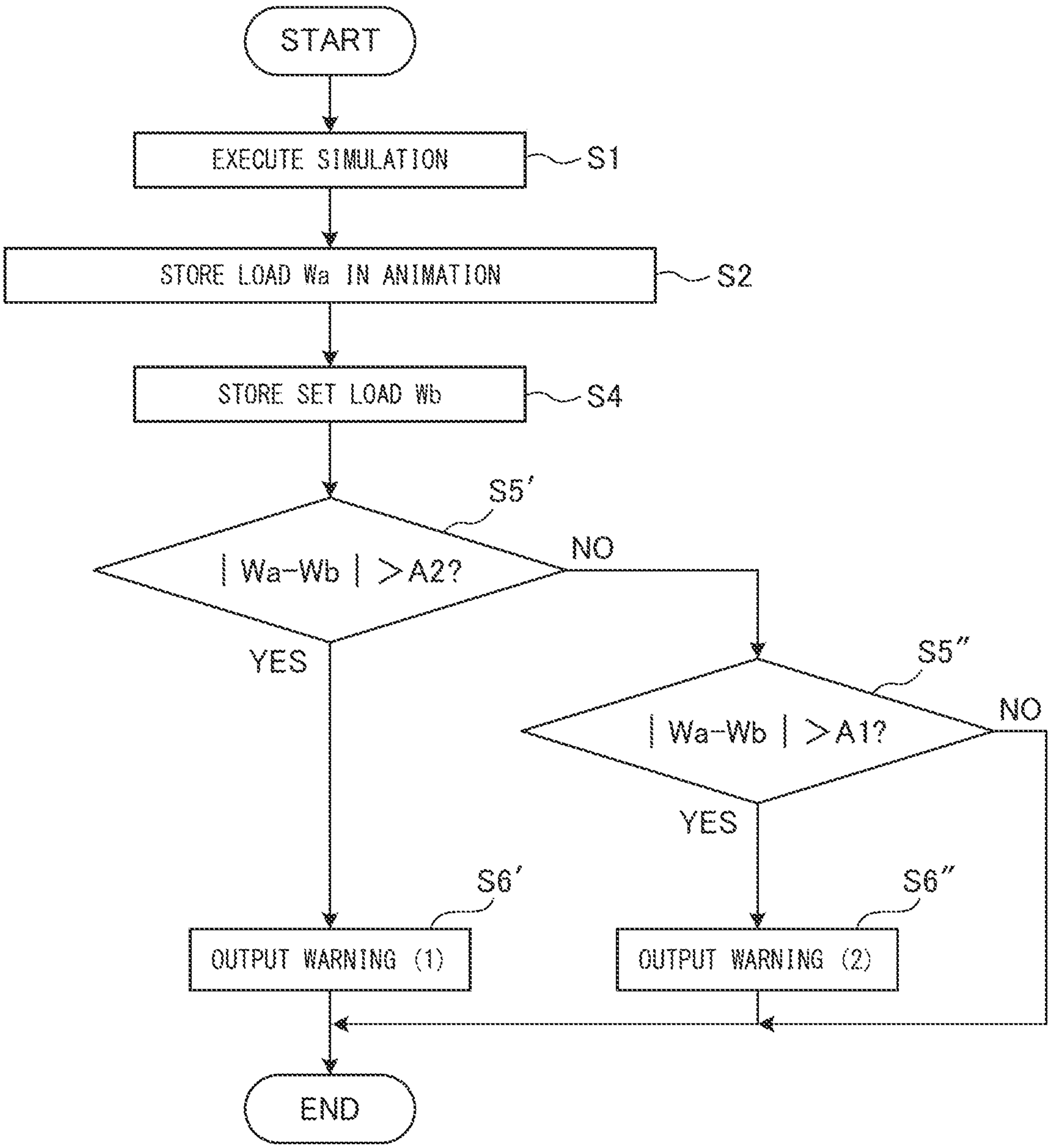
FIG. 4 is a flowchart showing the operations of the robot simulation device based on a second embodiment.
Figure 5:
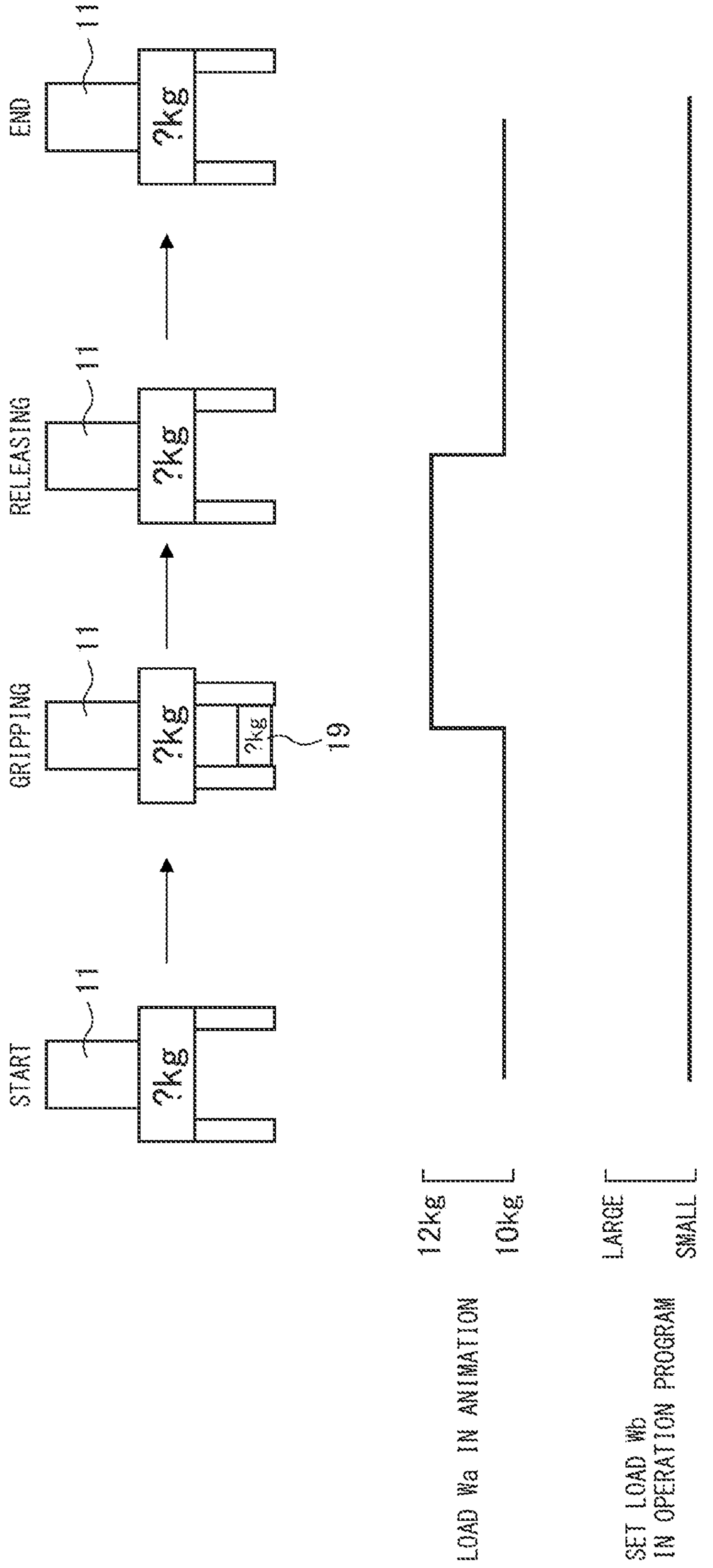
FIG. 5 is a diagram showing a load time chart of the second embodiment.

FIG. 4 is a flowchart showing the operation of the robot simulation device based on the second embodiment, and FIG. 5 is a diagram showing a load time chart in the second embodiment. Since steps S1 to S4 in FIG. 4 are the same as described above, duplicate description thereof has been omitted.

In step S5' of FIG. 4, it is determined whether the absolute value |Wa−Wb| of the difference is greater than a predetermined threshold A2. The threshold A2 is approximately equal to the total weight of the hand 11 and the workpiece 19.

In the example shown in FIG. 5, the load Wa in the animation increases from 10 kg to 12 kg at the time of "grasping", while the set load Wb shown by the solid line does not change from "start" to "end", and the value thereof is unknown.

In such a case, it can be determined that both load of the hand 11 and load of the workpiece 19 between "start" and "end" have not been input. In other words, in the second embodiment, the set load Wb was not actually stored in step S4. Thus, it is determined that the absolute value |Wa−Wb| of the difference at the time of "grasping" is greater than the threshold A2, and the process proceeds to step S6'. In step S6', the warning part 25 outputs a warning to the operator in the form of a sound or a message to modify the operation program 28. In this case, it is preferable that the warning by the warning part 25 indicate that both the load of the hand 11 and the load of the workpiece 19 have not been set.

In step S5', if it is determined that the absolute value |Wa−Wb| of the difference is not greater than the predetermined threshold A2, the process proceeds to step S5", and it is determined whether the absolute value | Wa−Wb| of the difference is greater than the threshold A1 described above. When it is determined as such, the process advances to step S6", and a warning indicating that the load of the workpiece 19 has not been set is output. This makes it possible to accurately indicate to the operator whether to modify only the load of the hand 11 (end effector) or both the load of the hand 11 (end effector) and the load of the workpiece 19 (related part) in the operation program 28.

It will be understood that in such a case, substantially the same effects as those of the embodiment described above can be obtained.

ASPECTS OF THE DISCLOSURE

According to a first aspect, there is provided a robot simulation device (1) which is executed by an offline programming system and which includes at least one robot (10) in an offline workspace, the device comprising a first load setting part (22*a*) for setting at least one of an end effector provided in the at least one robot and a related part of the end effector as a load, a second load setting part (22*b*) for setting a load to be exerted on the at least one robot in the simulation device and which is to be displayed by animation, a load storage part (23) which stores a set load (Wb) set by the first load setting part and a load (Wa) in the animation set by the second load setting part during simulation execution in the robot simulation device, and a comparison part (24) which compares the set load and the load in the animation stored by the load storage part.

According to a second aspect, the first aspect further comprises a warning part (25) which outputs a warning when a difference between the set load and the load in the animation is greater than or equal to a predetermined threshold.

According to a third aspect, in the second aspect, the warning part outputs different warnings depending on the predetermined threshold.

In the first aspect, since the load of the robot in the animation and the set load are compared, if the difference between the two exceeds a predetermined threshold, it can be understood that the set load has not been accurately set. Thus, by resetting the set load, the cycle time in the simulation becomes accurate, and as a result, it is possible to reduce on-site modification of the operation program.

In the second aspect, it is possible to alert the operator to modify the operation program.

In the third aspect, it is possible to alert the operator whether to modify only the load of the end effector or to modify both the load of the end effector and the load of related part in the operation program.

Though the embodiments of the present invention have been described above, a person skilled in the art would understand that various modifications and changes can be made without deviating from the scope disclosed in the claims below.

REFERENCE SIGNS LIST

1 simulation device
10 robot
11 hand (end effector)
19 workpiece (related part)
20 controller
21 simulation execution part
22*a* first load setting part
22*b* second load setting part
23 load storage part
24 comparison part
25 warning part
27 storage part
28 operation program
29 input part

The invention claimed is:

1. A robot simulation device which is executed by an offline programming system and which includes at least one robot in an offline workspace, the device comprising a processor, which is configured to:

read lines, where a set load is written, in an operation program of the at least one robot and set at least one of an end effector provided in the at least one robot and a related part of the end effector as a load, read lines, where an animation load is written, in the operation program and set a load to be exerted on the at least one robot in the simulation device and which is to be displayed by animation, store the set load and the animation load during simulation execution in the robot simulation device, wherein the set load and the animation load are simultaneously displayed on a display, compare a difference between the set load and the animation load with a predetermined threshold, and warn when the difference between the set load and the animation load is greater than or equal to the predetermined threshold.

2. The robot simulation device according to claim 1, wherein different warnings depending on the predetermined threshold are output.

* * * * *